United States Patent [19]

Miller

[11] 3,925,652

[45] Dec. 9, 1975

[54] CURRENT MODE CARRY LOOK-AHEAD ARRAY

[75] Inventor: Homer W. Miller, Peoria, Ariz.

[73] Assignee: Honeywell Information Systems Inc., Phoenix, Ariz.

[22] Filed: Mar. 26, 1975

[21] Appl. No.: 562,327

[52] U.S. Cl. .............................. 235/175; 307/216
[51] Int. Cl.[2] .............................. G06F 7/50
[58] Field of Search .............................. 235/175; 307/216

[56] References Cited

UNITED STATES PATENTS 3,700,875 10/1972 Saenger et al. .............................. 235/175

OTHER PUBLICATIONS

MECL 10,000, Motorola Inc., 1972, p. 3–7, 26.

*Primary Examiner*—R. Stephen Dildine, Jr.
*Attorney, Agent, or Firm*—Edward W. Hughes

[57] ABSTRACT

A carry look-ahead array is used with up to six 4 bit binary arithmetic/logic arrays to expeditiously process 24 bit binary data. Advantageously, two carry look-ahead arrays may be used in combination for processing 44 bit data, and seven carry look-ahead arrays may be used for processing 144 bit data. Soft saturating current mode circuit elements are employed which provide an output voltage swing between 0 volt and –0.5 volt.

7 Claims, 27 Drawing Figures

CURRENT MODE CARRY LOOK-AHEAD ARRAY

FIELD OF THE INVENTION

This invention relates generally to digital electronic circuitry, and more particularly to arithmetic and logic circuitry and carry look-ahead means for use with such circuitry.

BACKGROUND OF THE INVENTION

Increased operating speed of digital computers is coming through advancements at the system level and improved programming techniques and at the circuit level through improved circuit design and fabrication.

Disclosed in copending application No. 562,316, "Current Mode Arithmetic Logic Array," Homer W. Miller, assigned to the present assignee, is a 4 bit arithmetic array employing current mode logic circuit elements which provide simplified circuitry and enhanced functional characteristics.

To operate on large binary numbers a plurality of the 4 bit arrays must be combined. This may be a serial arrangement with each array operating on 4 of the numbers and with bit carry provided from each array to the next higher order array. It is readily apparent, however, that such serial operation is relatively slow as each array carry can be generated only after receiving the carry signal from the preceding lower order array.

Carry look-ahead circuits have been devised for use with such arithmetic arrays to increase speed, and the present invention is directed to a carry look-ahead array which employs the same current mode circuit elements as used in the arithmetic logic array of copending application 562,316, supra.

OBJECTS OF THE INVENTION

Accordingly, an object of the present invention is an improved carry look-ahead array for use with arithmetic/logic arrays.

Another object of the invention is a carry look-ahead array employing current mode logic.

Yet another object of the invention is a current mode logic array particularly useful with the arithmetic/logic array of copending application 562,316.

SUMMARY OF THE INVENTION

The carry look-ahead array in accordance with the present invention receives carry generate and carry propagate signals from associated arithmetic logic arrays and in response thereto generates carry output signals for each array.

Importantly, the carry generate and carry propagate signals produced by each arithmetic logic array are not dependent on inputs from other arrays but are functions of the binary data inputs to each array. Thus, each array upon receiving its binary data inputs can produce the carry generate and carry propagate signals, and after providing these signals to the carry look-ahead and subsequently receiving its carry input signal therefrom, the final data output of the array is generated. Data output for all arrays is combined for the resultant of the logic operation on the binary data input.

A feature of the invention is current mode circuit elements identical with the circuit elements of the arithmetic/logic array of copending application 562,316.

Objects and features of the invention will be more readily apparent from the following detailed description and appended claims when taken with the drawings.

DESCRIPTION OF A PREFERRED EMBODIMENT

Figure 1:
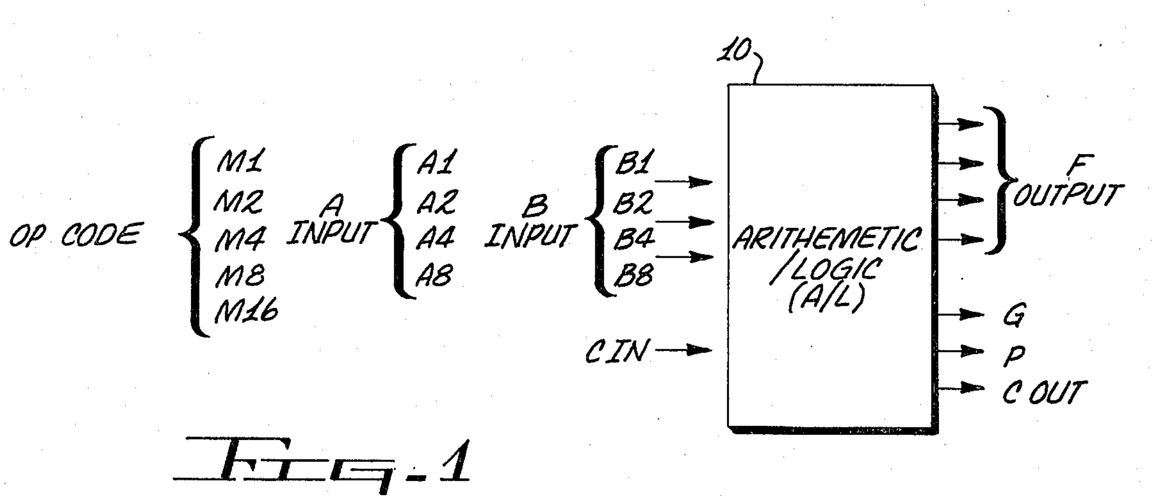
FIG. 1 is a functional diagram of a current mode arithmetic/logic array of copending application 562,316.

Referring now to the drawings, FIG. 1 is a functional diagram of the current mode arithmetic logic array of copending application 562,316 which functions in response to a binary op code, M1-M16, to logically operate on two 4 bit inputs, A1-A8, and B1-B8, and in response thereto produce a binary output signal, F1-F8. A carry input signal, $C_{in}$, is also provided to the arithmetic logic array 10. Additionally, a carry generate signal, G, a carry propagate, P, and a carry out signal, $C_{out}$, are generated by array 10.

Operation of array 10 is limited to four bit binary data. To operate on larger binary numbers a plurality of arithmetic logic arrays must be interconnected to accommodate the data. Referring t FIG. 2, a serial connection of arithmetic logic arrays 12, 14, andc 16 are shown with provision for connecting additional arrays shown illustratively between arrays 14 and 16 whereby binary data with N number of bits are accommodated. In this illustration the first four bits of the input data are connected to array 12 along with the operation code M, the second four bits of the input data are connected to array 14 along with the operation code M, and similar connections are made to other arrays with the final four and most significant bits of the data (N-3)-N, being provided to array 16 along with the operation code M. In this arrangement array 12 produces the first four bits, F1-F4, of the resultant of the logic function with a carry out provided to array 14. Array 14 in response to the four input bits of data A and data B along with the carry input signal generates the second four bits of the resultant, F5-F8, along with a carry out signal to the next array. Operation proceeds through each of the serially connected arrays until the final bits of the resultant, F (N-3)-FN, are generated.

Figure 2:
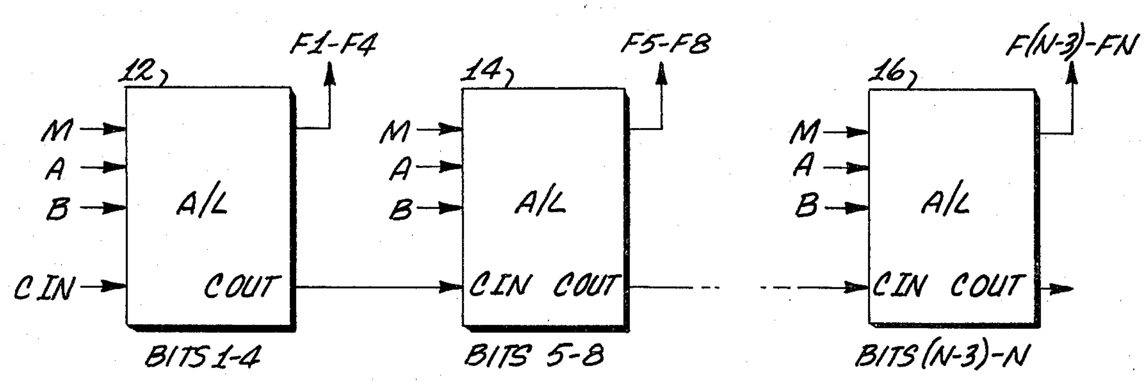
FIG. 2 is a functional diagram of a plurality of arithmetic/logic arrays of FIG. 1 serially combined for operating on binary numbers larger than the capacity of any one array.

It will be apprecited that the operating time of the serial arrangement illustrated in FIG. 2 is increased substantially with each array requiring a carry input signal before its carry output signal can be generated. Practically speaking, such a circuit arrangement is not feasible for computer applications.

Figure 3:
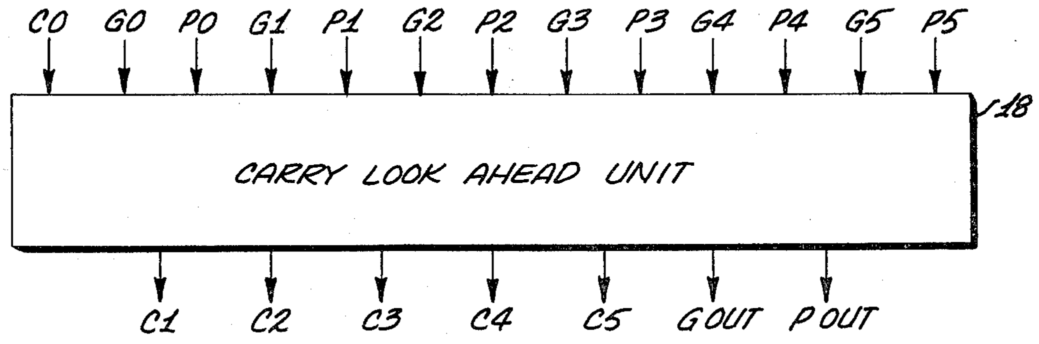
FIG. 3 is a functional diagram of a current mode logic carry look-ahead array in accordance with the present invention.

FIG. 3 is a functional diagram of a current mode logic carry look-ahead circuit in accordance with the present invention which is useful with a plurality of arithmetic logic arrays such as illustrated in FIG. 1, for operating on binary numbers which are larger than the capacity of any one array. In this illustrative embodiment, the carry look-ahead array 18 can accommodate six arithmetic logic arrays with the generate signal, G, and the propagate signal, P, from each array applied at inputs G0 and P0, G1 and P1, G2 and P2, G3 and P3, G4 and P4, and G5 and P5, respectively. Additionally, a carry input C0, may be applied to array 18. The G5 and P5 inputs are required only if $G_{out}$ and $P_{out}$ are needed, i.e., if array 18 is to be used with another similar array.

In response to the generate and propagate input signals, array 18 develops five carry output signals, C1-C5, which are connected back as the carry input signals to the respective arithmetic logic arrays. Further, array 18 generates a carry generate output signal, $G_{out}$, and a carry propagate output signal, $P_{out}$, whereby array 18 may be interconnected with one or more like arrays.

Figure 4:
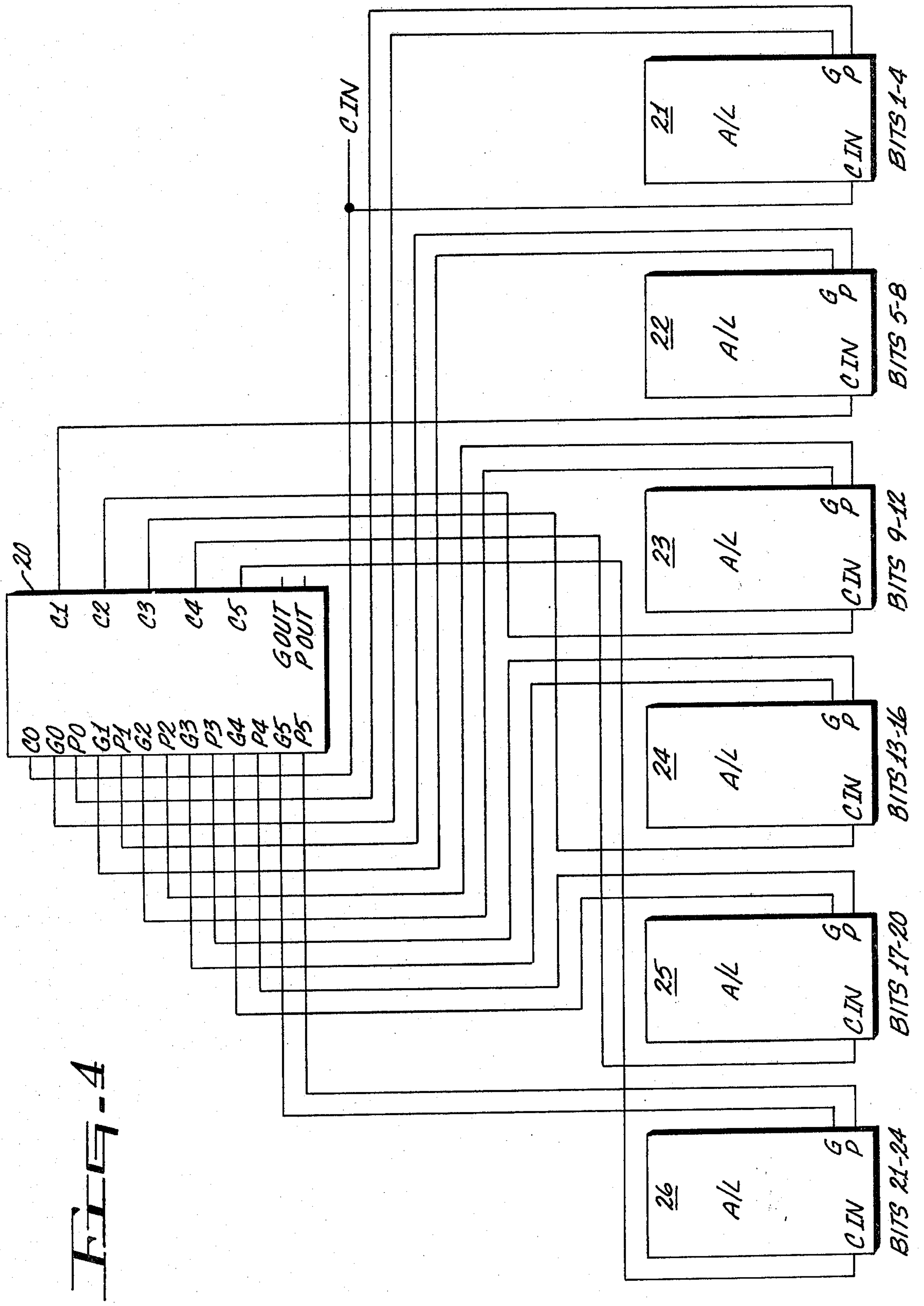
FIG. 4 is a functional diagram of the carry look-ahead array of FIG. 3 connected with six 4 bit arithmetic logic arrays for operating on 24 binary bit numbers.

FIG. 4 is a functional diagram of the carry look-ahead array of FIG. 3 interconnected with six 4 bit arithmetic logic arrays 21–26 for operating on 24 bit binary numbers. In this embodiment the carry input signal, $C_{in}$, is applied as an input to array 21 and as the input C0 to carry look-ahead array 20. Array 21 operates on the four least significant bits of the input data, and the G and P outputs therefrom are applied as the G0 and P0 inputs to array 20. Array 22 operates on the next four least significant bits of the input data and the G and P outputs therefrom are applied as the G1 and P1 inputs to array 20. Similar operation is provided by the other arithmetic logic arrays with array 26 operating on the four most significant bits of the input data, and the G and P outputs therefrom are applied as the G5 and P5 inputs to array 20, assuming the $G_{out}$ and $P_{out}$ signals are desired.

As will be described in more detail hereinbelow, the G0 and P0 inputs to array 20 along with carry C0 are utilized to generate the carry output signal C1. Similarly, the G1 and P1 inputs along with G0, P0, and C0 are utilized to generate the second carry output, C2; G2 and P2 inputs along with G1, P1, G0, P0, and C0 generate the third carry; C3; and G3 and P3 inputs along with G2, P2, G1, P1, G0, P0, and C0 generate the fourth carry, C4; and the G4 and P4 inputs along with G3, P3, G2, P2, G1, P1, G0, P0, and C0 generates the fifth carry, C5. The G5 and P5 inputs, received from arithmetic logic array 26 which operates on the most significant bits of the input data, are utilized along with the other G and P inputs to produce a generate out signal, $G_{out}$, and a propagate out signal, $P_{out}$, which are utilized in operating look-ahead array 20 with other similar carry look-ahead arrays, as will be described with reference to FIGS. 5 and 6. Operation on data is expedited as arrays 21–26 concurrently generate the G and P outputs, and upon receiving the carrys from array 20 the data out may be developed concurrently.

Figure 5:
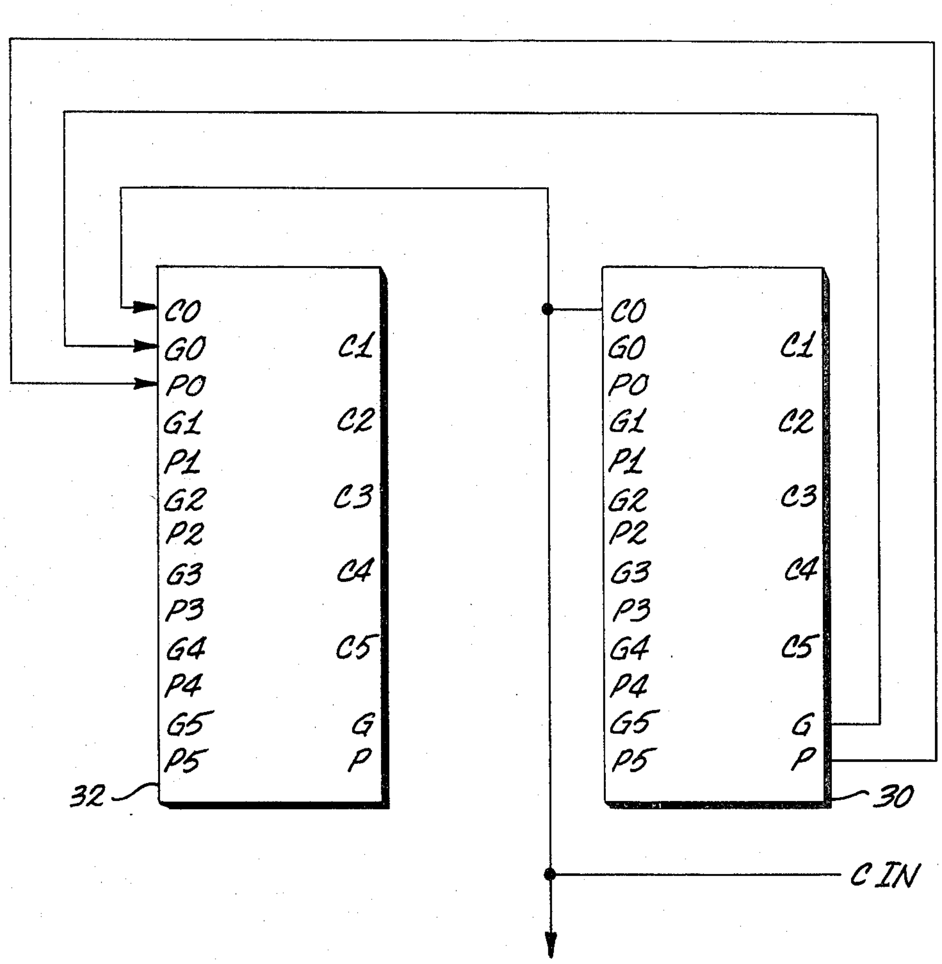
FIG. 5 is a functional diagram of two carry look-ahead arrays of FIG. 3 interconnected for operating on 44 bit binary numbers.

FIG. 5 is a functional diagram of two carry look-ahead arrays 30 and 32 which are interconnected for operation on 44 bit data. Each of the arrays is connected to a plurality of arithmetic logic arrays such as shown in FIG. 4, but for simplification purposes the arithmetic logic arrays are not illustrated in FIG. 5. Carry look-ahead array 30 is interconnected with six arithmetic logic arrays, exactly as illustrated in FIG. 4, with the carry input signal, $C_{in}$, applied to both array 30 and array 32. The carry generate, G, and the carry propagate, P, produced by array 30 are connected to the G0 and P0 inputs to array 32. Array 32 is also connected to five arithmetic logic arrays which provide the G1,P1-G5,P5 inputs, respectively. Thus, array 30 and its 6 interconnected arithmetic logic elements operate on the first 24 bits of the input data, while array 32 and its 5 interconnected arithmetic logic elements operate on the 20 most significant bits of the input data.

Figure 6:
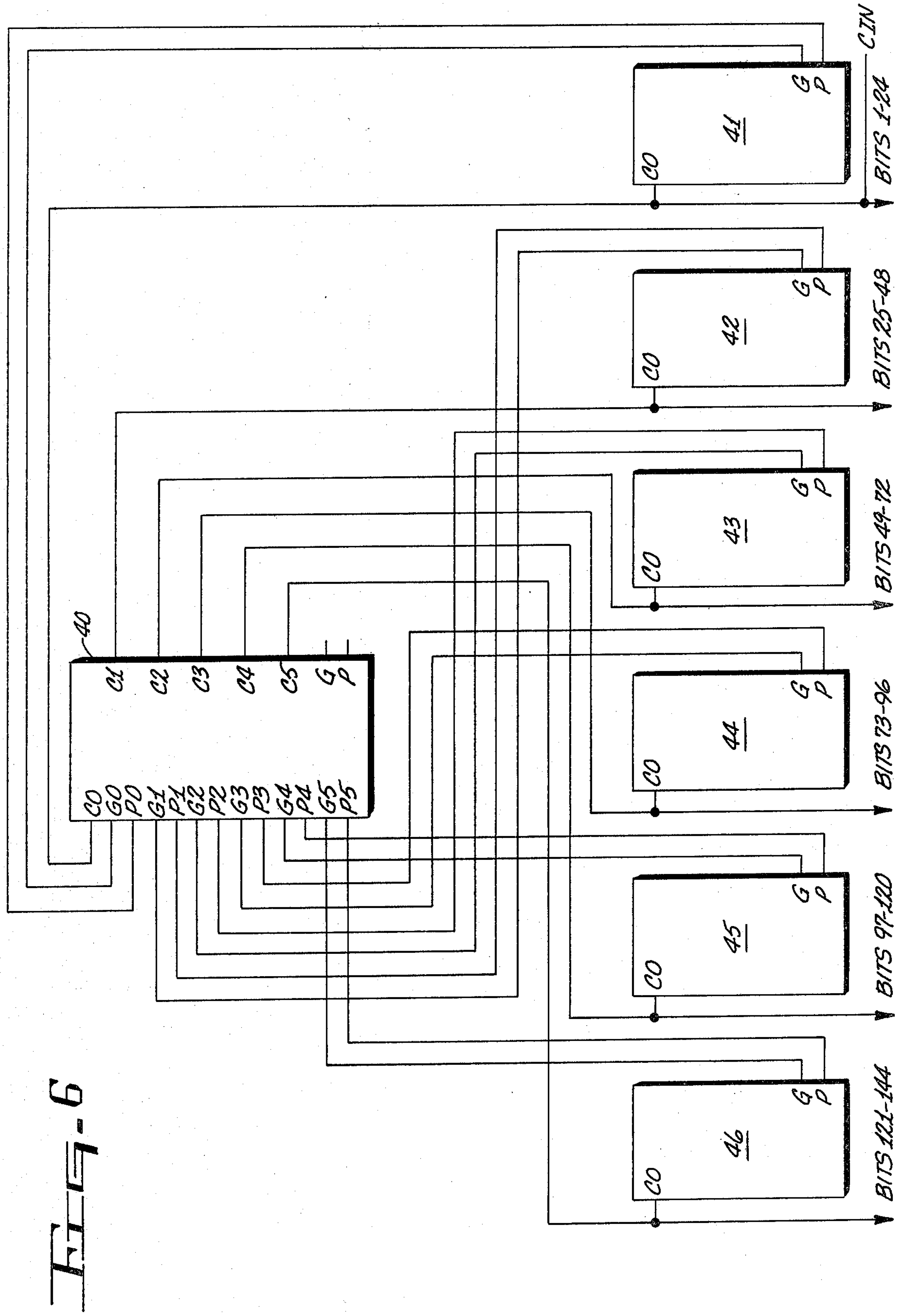
FIG. 6 is a functional diagram of a carry look-ahead array interconnected with six other carry look-ahead arrays for operating on 144 bit binary numbers.

FIG. 6 is a functional diagram of a carry look-ahead array 40 interconnected with six other carry look ahead arrays 41–46 for operating on 144 bit binary data. Again, in this embodiment each of the carry look-ahead arrays 41–46 is interconnected with 6 arithmetic logic arrays, as illustrated in FIG. 4, but for simplification the interconnected arithmetic logic arrays are not shown. Thus, each of the arrays 41–46 is capable of operating on 24 bits of data and array 40 is interconnected with the arrays 41–46 to expedite the operation on 144 bits of data.

The carry input signal, $C_{in}$, is applied to the carry input terminal of array 41 and to the C0 input terminal of array 40; the G and P outputs of array 41 are connected to the G0 and P0 inputs, respectively, of array 40. Similarly, the G and P outputs of arrays 42–46 are connected to the G1,P1-G5,P5 inputs of array 40, with the carry outputs C1-C5 being applied to the carry inputs to arrays 42–46, respectively. In a like manner the P and G outputs of array 40 may be interconnected with other carry look-ahead arrays to expedite arithmetic/logic operation on even larger binary data.

With the operation and utility of the carry look-ahead array in combination with a plurality of arithmetic logic arrays having been described, consider now the current mode implementation of the carry look-ahead array in accordance with the present invention, the most elemental of which is illustrated in FIGS. 7–14. In these figures the logic diagram or symbol is illustrated along with a schematic of the equivalent electrical circuits. As will be described, a series gate including a lower level gate and an upper level gate is provided which has an output voltage swing of only approximately 0.5 volt. This limited voltage swing reduces power requirements and reduces transition time.

Figure 7A:
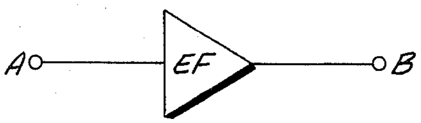
FIGS. 7a-14b are logic diagrams and equivalent electrical circuits of basic elements employed in the carry look-ahead array of the present invention.
Figure 7B:
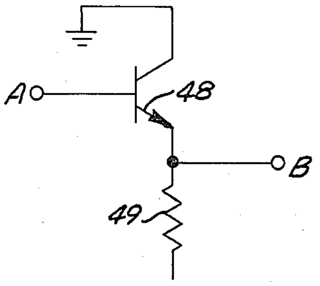

FIG. 7*a* is the symbol for an emitter follower with an input A and an output B and which is typically employed in a circuit where the signal at A has a large fan-out or is applied as the input to a plurality of circuits. The equivalent electrical circuit is shown in FIG. 7*b* where the input A is applied to the base of transistor 48 and the output B is taken at the common terminal of resistor 49 and the emitter of transistor 48.

Figure 8A:
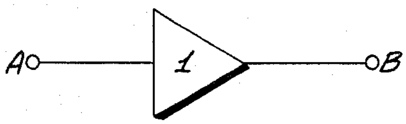
Figure 8B:
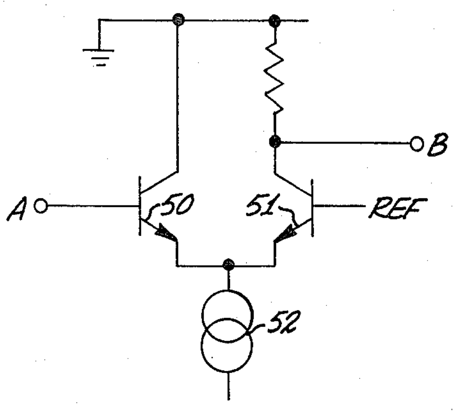

FIG. 8*a* is a buffer wherein input A is applied unchanged at the output B but which provides isolation between points A and B. In the electrical schematic of FIG. 8b input A is applied to the base of transistor 50 and the output B is taken at the collector of transistor 51. The emitters of transistors 50 and 51 are connected to current source 52, and the collector of transistor 50 is connected directly to ground and the collector of transistor 51 is connected through resistor 53 to ground. In operation and assuming a negative logic wherein 0 volt corresponds to a binary " and a –0.5 volt corresponds to a binary "1," a reference voltage of −0.26 volt is applied to the base of transistor 51. With NPN bipolar transistors as illustrated a binary 0 at input A causes conduction of transistor 50 and nonconduction of transistor 51 whereby the binary 0 is reflected as a 0 current at output B. Conversely, a binary "1" at input A renders transistor 50 nonconductive and transistor 51 is conductive thereby reflecting a binary "1" current at the output B.

Figure 9A:
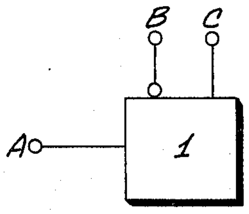
Figure 9B:
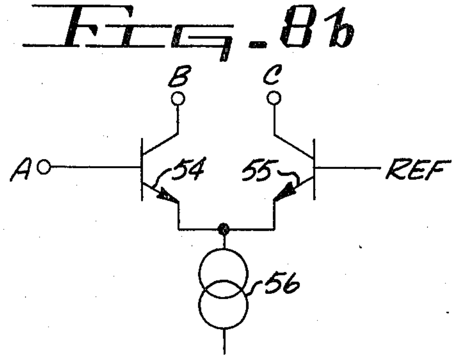

FIG. 9*a* is a lower level gate buffer with an input A, a real output C and a complement output B. In the electrical schematic of FIG. 9*b* input a is applied to the base of transistor 54, a reference voltage of approximately −1.06 volts is applied to the base of transistor 55, and the common emitters of transistors 54 and 55 are connected to current source 56. Output B is taken at the collector of transistor 54 and output C is taken at the collector of transistor 55.

Figure 10A:
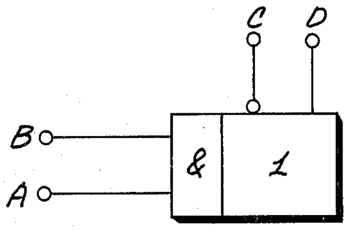
Figure 10B:
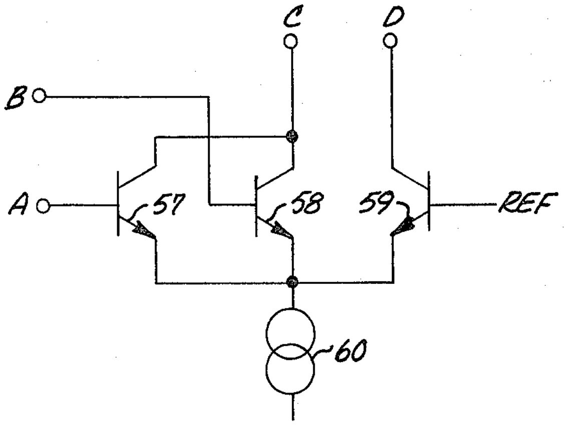

FIG. 10*a* is another lower level gate with inputs A and B and a real (AND) output D and a complement (NAND) output C. In the electrical schematic of FIG. 10*b* the A and B inputs are applied to the bases of transistors 57 and 58, respectively, and a referene voltage of about −1.06 volts is applied to the base of transistor 59. The emitters of the transistors are connected in common to current source 60 and the D ($\overline{A}.\overline{B}$) output is taken at the collector of transistor 59 and the C (A.B) output is taken at the common terminal of the collectors of transistors 57 and 58.

Figure 11A:
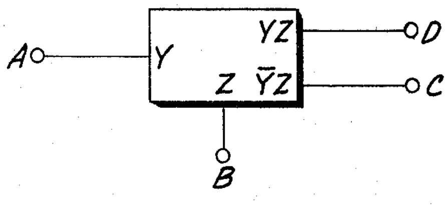
Figure 11B:
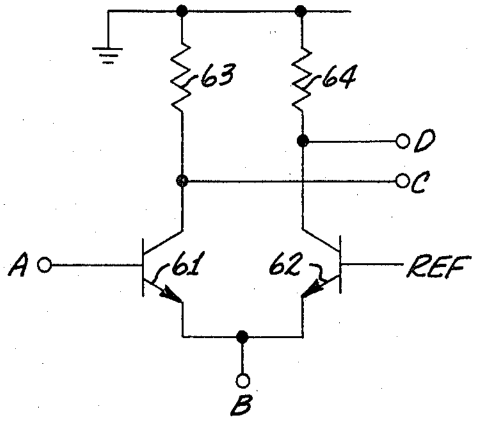

The upper level gate in FIG. 11 has inputs A and B applied to terminals Y and $\underline{Z}$, respectively, with the C and D outputs providing a $\overline{Y}$.Z and a Y.Z output, respectively. In the equivalent electrical schematic of FIG. 11*b* input A is applied to the base of transistor 61 and input B is applied to the common terminal of the emitters of transistors 61 and 62. A reference voltage of −0.26 volt is applied to the base of transistor 67, and the collectors of transistors 61 and 62 are connected through resistors 63 and 64, respectively, to ground. The C output is taken at the collector of transistor 61 and the D output is taken at the collector of transistor 62.

Figure 12A:
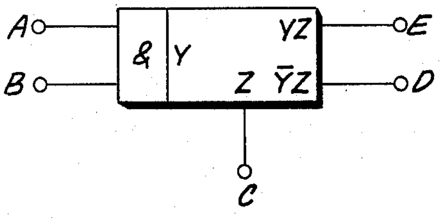
Figure 12B:
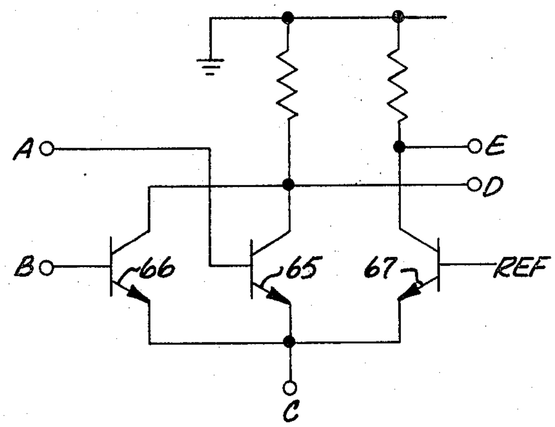

The upper level gate in FIG. 12*a* is similar in function to FIG. 11*a* but with the Y variable being the AND function of inputs A and B and the Z function being the input C. Thus, output E equals A.B.C. and output D equals $\overline{A}.\overline{B}$.C. In the electrical equivalent of FIG. 12*b*, the A and B inputs are applied to the bases of transistors 65 and 66, respectively, the C input is applied to the common terminal of the emitters of transistors 65, 66, and 67; the D output is taken at the common terminal of the collectors of transistors 65 and 66; and the E output is taken at the collector of transistor 67. For current to flow through the E output, inputs A and B must both be a "1" or −0.5 volt (thus rendering transistor 67 conductive) and input C must be present. Otherwise, if either the A or B inputs are a binary "0" (0 volt) and the Z input is present current will flow through output terminal D.

The upper level gates of FIGS. 11 and 12 are used in combination with the lower level gates of FIGS. 9 and 10. As described, the reference voltage for the upper level gates is −0.26 volt and the logic inputs being either 0 volt or −0.5 volt. The output voltage swings between 0 and −0.5 volt. Inputs to the lower level gates are derived from emitter followers, and the consequent voltage translation necessitates a reference voltage of −1.06 volts therefor.

Figure 13:
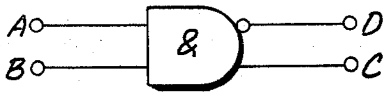
Figure 14A:
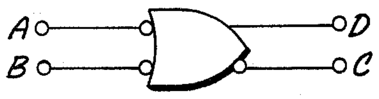

The logic diagrams of FIGS. 13 and 14 are equivalent wherein FIG. 13 performs an AND function on the inputs A and B with the real output provided at C and the complement or NAND output provided at D. The OR gate of FIG. 14 is equivalent in function wherein the A and B inputs are inverted prior to application to the OR gate with output D being real ($\overline{A}$+$\overline{B}$) and output C being inverted (A.B).

Figure 14B:
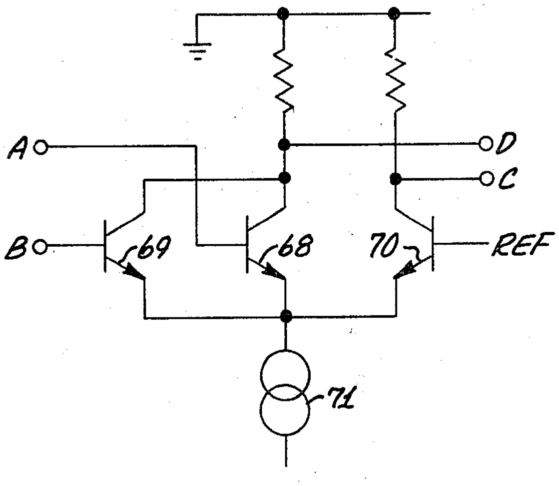

In the equivalent schematic circuit of FIG. 14*b*, the A and B inputs are applied to the bases of transistors 68 and 69, respectively, and a reference voltage is applied to the base of transistor 70. A current source 71 is connected to the common terminal of the emitters of transistors 68, 69, and 70; the C output is taken at the collector of transistor 70 and the D output is taken at the common terminal of the collectors of transistors 68 and 69. If the inputs A and B are both binary "1" then output C becomes a binary "1" due to current through transistor 70. If inputs A and B are not both binary "1," then output D becomes a binary "1" due to current through either transistor 68 or 69.

With these basic functional elements defined by logic diagram and equivalent circuits, consider now the schematics of the circuits of the carry look-ahead array which develop the carry output signals and generate and propagate output signals in accordance with the present invention, as illustrated in FIGS. 15–20.

Figure 15:
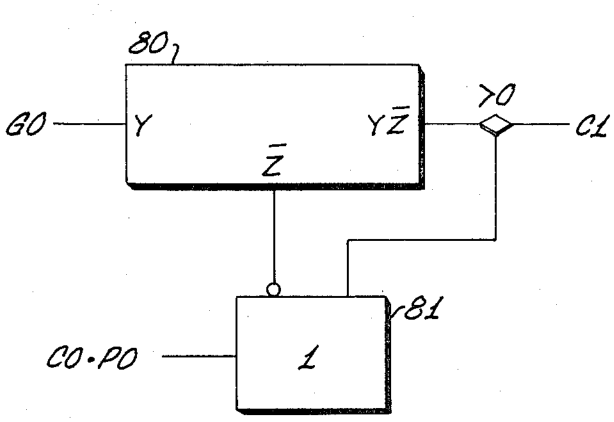
FIGS. 15–20 are schematics of the circuits of the carry look-ahead array which develop carry output signals and generate and propagate output signals in accordance with the present invention.

The first carry, C1, of the carry look-ahead array is generated by the circuit shown in FIG. 15 which comprises circuit elements 80 and 81, corresponding to the function elements shown in FIG. 11 and FIG. 9, respectively. G0 is applied to the Y input of circuit 80 and the AND function of C0 and P0 (C0.P0) is applied to the input of circuit 81 whereby

C1 = (G0) + (P0.C0)

The Z input is received from the complement output of element 81. The C0.P0 input to element 81 may be derived from an AND gate or from two emitter followers with a common output terminal. With negative logic convention and NPN transistors in the emitter followers and AND function is thus achieved.

Figure 16:
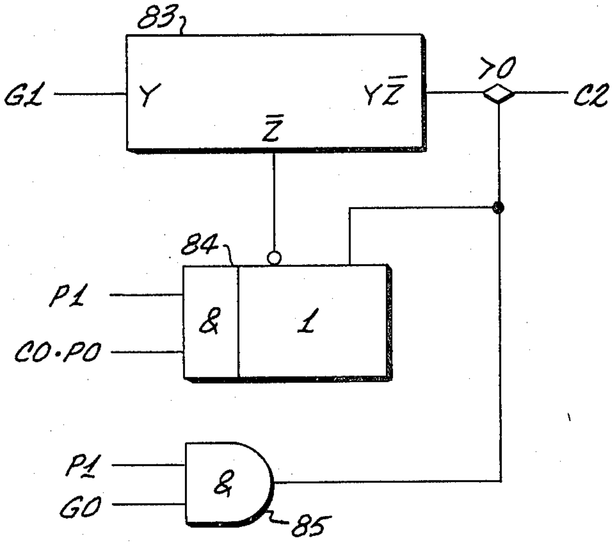

FIG. 16 is a functional schematic of the circuit portion of the look-ahead array which generates the second carry, C2, and comprises circuits 83, 84, and AND gate 85. These circuits correspond to the functional elements illustrated in FIGS. 11, 10, and 13, respectively. G1 is applied to the Y input of circuit 83; P1 and the AND function of C0 and P0 (C0.P0) is applied to the inputs of circuit 84; and P1 and G0 are applied as the two inputs to AND gate 85, whereby

C2 = (G1) + (P1.G0) + (P1.P0.C0)

Figure 17:
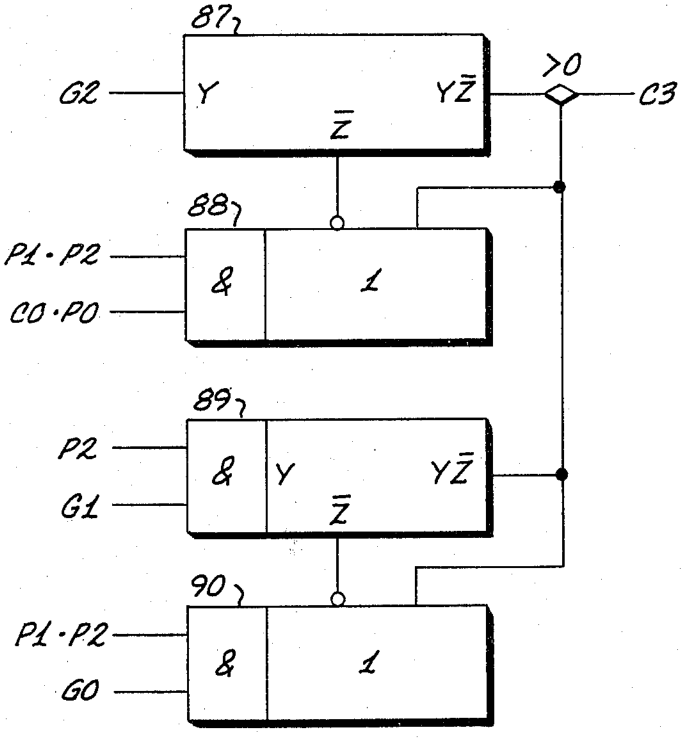

FIG. 17 is the schematic of the circuit which generates the third carry (C3) and includes circuits 87, 88, 89, and 90 which correspond respectively to the functional elements illustrated in FIGS. 11, 10, 12, and 10. G2 is applied to the Y input of circuit 87; P1, P2, G0, and P0 are applied as the inputs to circuit 88; P2 and G1 are applied as the two inputs to circuit 89, and G0, P1, and P2 are applied as the two inputs to circuit 90 whereby

C3 = (G2) + (P2.G1) + (P2.P1.G0) + (P2.P1.P0.C0)

Figure 18:
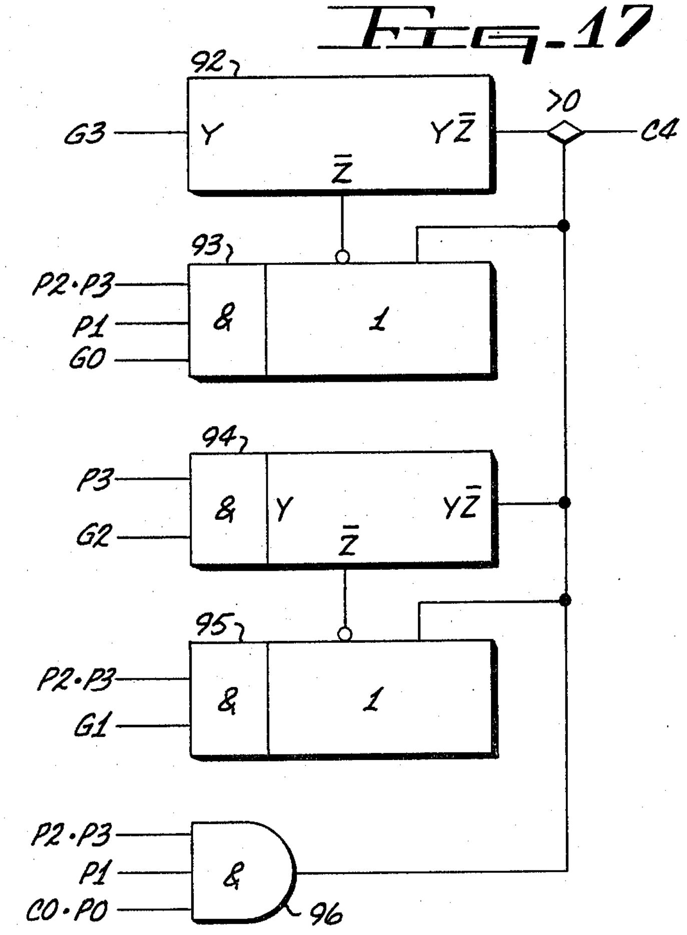

The fourth carry, C4, is generated by the circuit illustrated in FIG. 18 comprising circuit elements 92, 93, 94, 95, and 96. These circuit elements correspond respectively to the functional elements illustrated in FIGS. 11, 10, 12, 10, and 13. G3 is applied as the Y input to ciricuit 92; G0, P1, P2, and P3 are applied as inputs to circuit 93; G2 and P3 are applied as the Y inputs to circuit 94; G1, P2 and P3 are applied as the inputs to circuit 95; and C0, P0, P1, P2, and P3 are applied as inputs to AND gate 94 whereby

C4 = (G3)+(P3.G2)+(P3.P2.G1)+(P3.P2.P1.G0)+(P3.P2.P1.P0.C0)

Figures 19, 20:
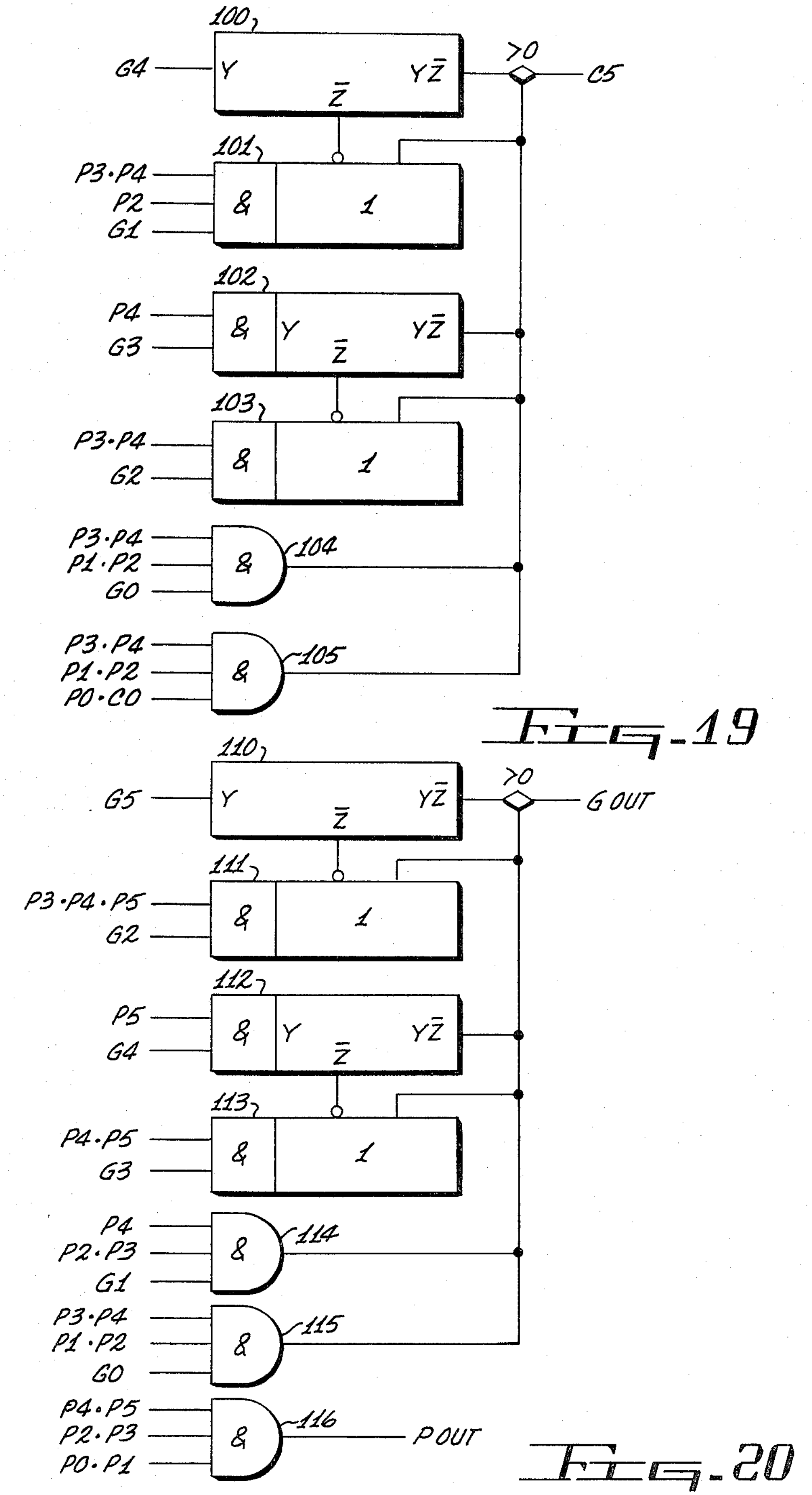

FIG. 19 is the schematic of the circuit for generating the fifth carry, C5, and comprises circuit elements 100, 101, 102, 103, 104, and 105, which correspond respectively to the functional elements shown in FIGS. 11, 10, 12, 10, 13, and 13, respectively.

G4 is applied to the Y input of circuit 100 with the $\overline{Z}$ input coming from the complementary output of element 101; G1, P2, P3, and P4 are applied as the inputs to circuit 101; G3 and P4 are applied to the Y inputs of circuit 102 with the $\overline{Z}$ input coming from complementary output of circuit 103. The inputs to circuit 103 are G2, P3, and P4; G0, P1, P2, P3, and P4 are applied as the inputs to AND gate 104; and P0.C0, P1.P2, and P3.P4 are applied as inputs to AND gate 105, whereby C5 = (G4)+(P4.G3)+(P4.P3.G2)+(P4.P3.P2.G1) + (P4.P3.P2.P1.G0)+(P4.P3.P2.P1.P0.C0)

The $G_{out}$ and $P_{out}$ signals are generated by the circuit illustrated schematically in FIG. 20 which comprises circuit elements 110, 111, 112, 113, 114, 115, and 116. These circuits correspond respectively to the functional elements illustrated in FIGS. 11, 10, 12, 10, 13, 13, and 13.

G5 is applied as the Y input of circuit 110 with the $\overline{Z}$ input coming from the complementary output of circuit 111. G2, P3, P4, and P5 are applied as inputs to circuit 111. G4 and P5 are applied as the Y inputs of circuit 112 with the $\overline{Z}$ input coming from the complementary output of circuit 113. G3, P4 and P5 are applied as the inputs to circuit 113. AND gate 114 receives G1, P2, P3, and P4 inputs; AND gate 115 receives G0, P1, P2, P3, and P4 inputs; and AND gate 116 receives P0, P1, P2, P3, P4, and P5 as inputs whereby $G_{out}$ = (G5)+(P5.G4)+(P5.P4.G3)+(P5.P4.P3.G2) + (P5.P4.P3.P2.G1)+(P5.P4.P3.P2.P1.G0)

$P_{out}$ = (P5.P4.P3.P2.P1.P0)

Carry look-ahead arrays employing current mode logic elements as described above have proved particularly useful with the arithmetic/logic arrays disclosed in copending application 562,316. Circuit simplicity and ease of circuit integration are achieved with the current mode logic along with decreased electrical power requirements. While the invention has been described with reference to specific embodiments, the description is illustrative and not to be construed as limiting the scope of the invention. Various modifications and changes may occur to those skilled in the art without departing from the true spirit and scope of the invention as defined by the appended claims.

What is claimed is:

1. A current mode logic carry look-ahead array for use with up to six arithmetic/logic circuits, each arithmetic/logic circuit processing a limited number of bits of binary data in response to an operation code (M1-M16), a carry input (C), and input data (A1-A8, B1-B8), and producing output data (F1-F8) and carry generate ($G_i$) and carry propagate ($P_i$) signals, said carry look-ahead array comprising a plurality of logic circuits for receiving the carry generate ($G_i$) and carry propagate ($P_i$) signals from said arithmetic/logic circuits and the initial carry-in ($C_{in}$) signal and simultaneously producing carry signals for the arithmetic/logic circuits in accordance with the following equations:

C1 = (G0)+(P0.C0)

C2 = (G1)+(P1.G0)+(P1.P0.C0)

C3 = (G2)+(P2.G1)+(P2.P1.G0)+(P2.P1.P0.C0)

C4 = (G3)+(P3.G2)+(P3.P2.G1)+(P3.P2.P1.G0) +(P3.P2.P1.P0.C0)

C5 = (G4)+(P4.G3)+(P4.P3.G2)+(P4.P3.P2.G1) +(P4.P3.P2.P1.G0)+(P4.P3.P2.P1.P0.C0)

2. A current mode logic carry look-ahead array as defined by claim 1 wherein each of said logic circuits comprises soft saturating current mode logic gates having an output voltage range limited to approximately ½ volt.

3. A current mode logic carry look-ahead array as defined by claim 1 and further including a second plurality of logic circuits for producing carry generate ($G_{out}$) and carry propagate ($P_{out}$) signals, for use with other carry look-ahead arrays, in accordance with the following equations:

$G_{out}$ = (G5)+(P5.G4)+(P5.P4.G3)+(P5.P4.P3.G2) + (P5.P4.P3.P2.G1)+(P5.P4.P3.P2.P1.G0)

$P_{out}$ = (P5.P4.P3.P2.P1.P0)

4. A current mode logic carry look-ahead array as defined by claim 2 wherein each of said plurality of circuits comprises soft saturating current mode logic gates having an output voltage range limited to approximately one-half volt.

5. A current mode logic carry look-ahead array as defined by claim 4 wherein said soft saturating current mode logic gates include an upper level gate comprising a first NPN bipolar transistor and at least a second NPN bipolar transistor, means interconnecting the emitters of said first and second transistors to a common terminal, means interconnecting a current source to said common terminal, resistive means connecting the collector of said first transistor to a circuit ground potential, means connecting the collector of said second transistor to circuit ground potential, means appling a reference voltage of approximately −0.26 volt to the base of said first transistor, whereby binary input signals of 0 volt and −0.5 volt applied to the base of said second transistor are translated to output terminals at the collectors of said first and second transistors as real and complement outputs, respectively, of either 0 volt or −0.5 volt.

6. A current mode logic carry look-ahead array as defined by claim 5 and including a third NPN bipolar transistor with emitter and collector connected in parallel with the emitter and collector of said second transistor whereby said second and third transistors provide an AND function for input signals applied to the emitters of said second and third transistors.

7. A current mode logic carry look-ahead array as defined by claim 5 wherein said means for inconnecting a current source to said common terminal comprises a lower level gate.

* * * * *